United States Patent [19]

Hsu

[11] Patent Number: 5,350,791
[45] Date of Patent: Sep. 27, 1994

[54] HYDROPHILICIZING TREATMENT FOR METAL OBJECTS

[75] Inventor: Chi-Fan Hsu, Farmington Hills, Mich.

[73] Assignee: Henkel Corporation, Plymouth Meeting, Pa.

[21] Appl. No.: 62,091

[22] Filed: May 14, 1993

Related U.S. Application Data

[63] Continuation-in-part of Ser. No. 908,662, Jul. 2, 1992, abandoned.

[51] Int. Cl.$^5$ .......................... C08J 7/06; C08K 5/06
[52] U.S. Cl. ........................ 524/366; 524/442;
524/556; 524/588; 524/599; 524/804; 524/832;
428/413; 428/418; 428/933; 427/337; 427/343;
427/344; 427/372.2; 427/387; 148/251;
148/257; 148/265
[58] Field of Search .............. 524/366, 442, 556, 588,
524/599, 804, 832; 427/337, 343, 344, 372.2,
387; 428/413, 418, 933; 148/251, 257, 265

[56] References Cited

U.S. PATENT DOCUMENTS

| | | | |
|---|---|---|---|
| 4,131,489 | 12/1978 | Newhard | 148/6.16 |
| 4,146,410 | 3/1979 | Reinhold | 148/6.2 |
| 4,668,305 | 5/1987 | Dollman et al. | 148/6.16 |
| 4,847,316 | 7/1989 | Schick et al. | 524/88 |
| 4,954,372 | 9/1990 | Sako et al. | 427/388.2 |
| 5,178,690 | 1/1993 | Maiquez | 148/265 |

FOREIGN PATENT DOCUMENTS

| | | |
|---|---|---|
| 59-185779 | 10/1984 | Japan . |
| 60-101156 | 6/1985 | Japan . |
| 60-221582 | 11/1985 | Japan . |
| 61-008598 | 1/1986 | Japan . |
| 62-186199 | 8/1987 | Japan . |

Primary Examiner—John Kight, III
Assistant Examiner—Duc Truong
Attorney, Agent, or Firm—Ernest G. Szoke; Wayne C. Jaeschke; Norvell E. Wisdom, Jr.

[57] ABSTRACT

Substantially improved retention of hydrophilicity after exposure to high temperature can be provided on a metal substrate, particularly an aluminum alloy of the type used for heat exchanger fins by an aqueous liquid hydrophilicizing treatment composition containing acrylic and/or methacrylic acid polymer or copolymer, polyether alcohol, and alkali metal silicate. The treatment composition may also contain an anti-microbial agent and additional alkalinizer. The hydrophilicizing treatment is preferably applied over a conventional conversion coating, particularly a chromium phosphate or chromium oxide conversion coating.

20 Claims, No Drawings

HYDROPHILICIZING TREATMENT FOR METAL OBJECTS

CROSS-REFERENCE TO RELATED APPLICATION

This application is a continuation-in-pan of copending application Ser. No. 908,662 filed on Jul. 2, 1992, abandoned Jul. 23, 1993.

BACKGROUND OF THE INVENTION

1. Field of the Invention

This invention relates to a hydrophilicizing treatment for surfaces with underlying metal, normally one already beating a corrosion protective conversion coating such as a chromate or phosphate conversion coating. After treatment according to this invention, the surface will have a greater affinity for water than before the treatment, as normally evidenced by a greater tendency for water to spread spontaneously over the surface. The invention is particularly advantageously applicable to provide aluminum evaporators, heat exchangers, and condensers with hydrophilic coatings that have good corrosion resistance and a durably hydrophilic character with little or no tendency to develop undesirable odors during use.

2. Statement of Related Art

Although any of the common metals can be used in constructing practical heat exchanging surfaces, aluminum and its alloys are among those most often used, because of their high heat conductivity. In heat exchanger surfaces, metals are normally used without any relatively thick protective coating such as a paint or lacquer that would normally be used to improve the resistance of the metals to corrosion in most other types of metal structures, but is avoided in heat exchangers because such a coating would also reduce the efficiency of heat exchange.

During the cooling of hot air, a common use of these heat exchangers, moisture contained as vapor in the hot air condenses and initially forms water drops or beads on the fins of the heat exchanger. If the surface of the heat exchanger fins is not sufficiently hydrophilic, the water beads accumulate on the fin surface and impede the air flow between fins and also reduce the heat transfer efficiency. The condensed water beads also tend to absorb dust and contaminants in the air, such as carbon dioxide, nitrogen oxides, and sulfur oxides, which often promote aluminum corrosion formation. Therefore, the formation of water beads on the fins of aluminum heat exchanger not only decreases heat transfer efficiency but also can cause the corrosion of aluminum.

DESCRIPTION OF THE INVENTION

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the exact numerical limits stated is generally preferred. Furthermore, unless expressly stated to contrary below, a description of a material as selected or preferably selected from a group of specified chemical materials shall be considered to include selection from a mixture of materials each of which is a member of the stated group. Also, the terms "solution", "soluble", and the like are to be understood as including not only true equilibrium solutions but also dispersions that show no visually detectable tendency toward phase separation over a period of observation of at least 1000 hours. Furthermore, the description of materials in ionic form shall be understood as implying the presence of counterions as needed for electrical neutrality of the total composition. To the extent possible, such counterions are preferably chosen from other specified necessary or optional components of the compositions concerned. Otherwise, such counterions generally may be freely chosen, except for avoiding any that are detrimental to the objects of the invention. Also, unless otherwise stated, percentages are to be understood as percentages by mass or weight.

OBJECT OF THE INVENTION

Although the hydrophilicizing treatments from the prior art generally provide excellent hydrophilicity when freshly applied, it has been discovered that the hydrophilicity is often substantially diminished by exposure of the treated surface to heat. Also, some of the hydrophilicizing treatments of the prior art contain environmentally undesirable constituents such as hexavalent chromium and organic solvents. It is an object of this invention to provide a water based surface treatment composition for forming a hydrophilic coating with good corrosion resistance and good thermal stability of the hydrophilicity, while avoiding heavy metal ions, volatile organic solvents, and other environmentally undesirable constituents and not requiring excessive thermal energy in use.

SUMMARY OF THE INVENTION

It has been found that a desirable combination of hydrophilicity and corrosion resistance can be achieved on the surface of metals, particularly aluminum and its alloys containing at least 75% by weight aluminum, by contacting the surface, preferably already treated with a corrosion protective conventional conversion treatment, preferably a chromium oxide or chromium phosphate conversion coating, with an aqueous liquid composition comprising, preferably consisting essentially of, or more preferably consisting of, water and:

(A) from 1 to 300, preferably from 1 to 100, more preferably from 1 to 50, still more preferably from 2 to 10, grams per liter (hereinafter often abbreviated "g/L"), measured as dissolved solids, of a component selected from the group of water soluble polymers and copolymers of acrylic and methacrylic acids and salts thereof;

(B) from 1 to 300, preferably from 2 to 200, more preferably from 2 to 100, still more preferably from 10 to 30, g/L of a component of water soluble polyether molecules conforming to the general formula:

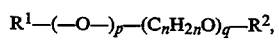

where each of $R^1$ and $R^2$ independently is H or an alkyl moiety containing not more than 4, preferably not more than 3, more preferably not more than 2, or most preferably only 1, carbon atom; p is either 0 or 1; n is an integer from 2 to 4 inclusive, preferably 2 or 3, most preferably 2, and the value of n may be selected independently for each of the q groups present in the polymer molecule; and q is an integer with a value of at least 2; and (C) from 5 to 200, preferably from 5 to 150, more preferably from 5 to 100, still more preferably from 15 to 60, g/L of a component of water soluble alkali metal silicates; and, optionally, (D) an anti-microbial effective amount of a anti-microbial agent; and, optionally, (E) from 2 to 100, preferably from 2 to 75, more preferably from 3 to 50, still more preferably from 7 to 30, g/L of a component of water soluble non-silicate alkalinizing agents to adjust the pH.

One embodiment of the invention is a composition as described above suitable for direct use in imparting hydrophilicity to a metal surface; such a composition may be described hereinafter as a "working composition". Another embodiment of the invention is a concentrate composition, which can be diluted with water to produce a working composition as specified above. A concentrate composition according to this invention preferably comprises, more preferably consists essentially of, or still more preferably consists of, from 1.0 to 60, more preferably from 1.0 to 20, still more preferably from 1.0 to 10% by weight of component (A); from 1.1 to 60, more preferably from 1.1 to 40, still more preferably from 1.1 to 20% by weight of component (B); from 1.0 to 40, more preferably from 1.0 to 30, still more preferably from 1.0 to 20% by weight of component (C); and from 0 to 20, more preferably from 0.4 to 14, still more preferably from 0.5 to 10% by weight of component (E), with each of components (A), (B), (C), and (E) being as described above or, with respect to preferred constituents, as further described below.

Still another embodiment of the invention is a process of contacting a metal surface with a composition according to the invention as described above.

DESCRIPTION OF PREFERRED EMBODIMENTS

With increasing preference in the order stated, component (A) as defined above should have a solubility in water of at least 0.01, 0.04, 0.11, 0.27, 0.50, 1.2, 4, 10, 28, 55, or 100 g/L, measured as dissolved solids. With increasing preference in the order given, at least 52, 73, 85, 90, 96, or 99% by weight of component (A) consists of residues from polymerizing monomers selected from the group consisting of acrylic acid, methacrylic acid, esters of acrylic and methacrylic acids with alcohols having no more than 4, more preferably no more than 2, or still more preferably only 1, carbon atoms; more preferably from the group consisting of acrylic and methacrylic acids; or most preferably residues of acrylic acid and/or its salts alone. The average molecular weight of component (A) preferably is in the range from 500 to $6.0 \times 10^6$, more preferably from 500 to $1.25 \times 10^6$, or still more preferably from 1000 to $5.0 \times 10^5$.

With increasing preference in the order stated, component (B) as defined above should have a solubility in water of at least 0.02, 0.05, 0.18, 0.35, 0.56, 1.7, 4, 11, 28, 55, or 100 g/L, measured as dissolved solids. Normally, for reasons of economy, component (B) is preferably selected from commercially available homo- and/or copolymers/oligomers of epoxyethane (also commonly known as ethylene oxide), 1,2-epoxypropane (also commonly known as propylene oxide), 1,2-epoxybutane (also commonly known as butylene oxide), and/or tetrahydrofuran. Any of these homo- and/or co-polymers may be terminated with alkyl or hydroxyl groups. With increasing preference in the order given, at least 35, 53, 72, 85, 90, 92, or 95% by weight of component (B) consists of molecular blocks which could have been made by polymerizing a mixture of molecules of ethylene oxide, propylene oxide, butylene oxide, and/or tetrahydrofuran. The average molecular weight of component (B), with increasing preference in the order given, is in the range from 76 to $6 \times 10^6$, 76 to $5 \times 10^5$, 76 to $1.0 \times 10^5$, or 150 to 2000.

With increasing preference in the order stated, component (C) as defined above should have a solubility in water of at least 0.35, 0.56, 1.7, 4, 11, 28, 55, or 100 g/L, measured as dissolved solids. With increasing preference in the order given, at least 35, 52, 70, 84, 90, 96, or 99% by weight of component (C) consists of silicates of sodium and/or potassium, in which the atomic ratio between alkali metal and silicon atoms is in the range from 0.35:1.0 to 5.0:1.0, more preferably from 0.40:1.0 to 4.0:1.0, still more preferably from 0.4:1.0 to 1.0:1.0. (In calculating these ratios, the alkali metal ions present should be allocated to provide counterions for any stoichiometrically well defined anions, such as hydroxide and phosphates, also found to be present, with only the remaining alkali metal ions being considered as part of the alkali metal silicates.)

Under certain conditions, compositions containing only components (A)–(C) as described above have been found to develop undesired growth of microbes such as fungi during storage. A wide variety of antimicrobial agents are known in the art and are suitable for use in compositions according to this invention, in order to prevent such growth. Examples include zinc 2-pyridinethiol-1-oxide, poly{hexamethylenebiguanide} hydrochloride, 1,2-benzisothiazoline-3-one, 4-chloro-3,5-xyleneol, amine 4,4-dimethyloxazolidines, abietic acid, tetrachloroisophthalonitrile, diioclomethyl-p-tolylsulfone, 3-iodo-2-propylbutyl carbonate, 2[(hydroxymethyl)amino]-2-methyl- 1-propanol, 2[(hydroxymethyl)amino]ethanol, 1-(4-thiazolyl)benzimidiazole, 1-methyl -3,5,7-triaza-l-azoniatricylcodecane chloride, and hexahydro- 1,3-5-tris(2-hydroxyethyl)-S-triazine. Generally, total amounts of from 0.03 to 0.20% of antimicrobial agent, preferably 1-(4-thiazolyl)benzimidiazole in a powder or paste form, are preferred in a concentrate composition according to this invention.

A working composition according to the invention preferably has a pH in the range from 7 to 14, more preferably from 9.0 to 14, still more preferably from 10.0 to 13.0. If an alkalinizing agent is needed to bring the pH into these ranges when the other necessary and-/or preferred ingredients are used alone, alkali metal hydroxides and/or phosphates, including condensed phosphates, are preferably used for this purpose, with a combination of potassium hydroxide and tetrapotassium pyrophosphate particularly preferred.

The hydrophilicizing process according to the invention is preferably accomplished by contacting a metal surface already bearing a corrosion protective conversion coating with a composition according to the invention as described above at temperature within the range from 10 to 90, more preferably from 12 to 75, still more preferably from 15° to 60° C. for a time within the range from 5 seconds (hereinafter often abbreviated "sec") to 30 minutes (hereinafter often abbreviated "min"), more preferably from 10 sec to 10 min, still more preferably from 10 to 300 sec. Contact may be accomplished by any convenient means, such as immersion, spray, squeegee roll, brush, and the like; many such means of contact are known per se in the art.

After the hydrophilicizing treatment, the treated surface is normally dried, preferably without any intermediate rinsing. While drying in the natural atmosphere without any use of heat can be used, normally faster drying by any convenient method is preferred; drying methods also are well known in the art. It is preferred that the temperature of the treated metal surface be maintained within the range from 10 to 300, more preferably from 15 to 250, still more preferably from 30° to 200° C. during drying. The mass added to the surface treated by the hydrophilicizing treatment according to the invention is preferably within the range from 0.05 to 3.0, more preferably from 0.1 to 2.0, still more preferably from 0.1 to 1.5, grams per square meter (hereinafter often abbreviated as "g/m$^2$") of surface treated.

For various reasons it is often preferred that compositions according to the invention as defined above should be substantially free from many ingredients used in compositions for similar purposes in the prior art. Specifically, it may be increasingly preferred in the order given, independently for each preferably minimized component listed below, that these compositions, when directly contacted with metal in a process according to this invention, contain no more than 1.0, 0.35, 0.10, 0.08, 0.04, 0.02, 0.01, or 0.001 percent by weight (hereinafter "w/o") of each of the following constituents: hexavalent chromium, ferricyanide, ferrocyanide, anions containing sulfur, molybdenum, or tungsten, any metallic elements (other than silicon) in an oxidation state of +2 or higher, nitrate and other oxidizing agents (the others being measured as their oxidizing stoichiometric equivalent as nitrate), organic liquids with a boiling point below 120° C., organic compounds containing amino and/or amido groups, and undissolved dispersed silica exclusive of that chemically combined with an alkali metal as part of component (C) as described above.

For aluminum substrates, it is preferred that the surfaces to be treated according to this invention first be provided with a conventional chromium containing conversion coating treatment selected from the types of treatments generally known in the art as "chromium phosphate" and "chromium oxide" treatments. The former are illustrated, without limitation, by U.S. Pat. Nos. 4,668,305 and 4,131,489 and the latter is illustrated, without limitation, by U.S. Pat. No. 4,146,410. The add-on mass from the conversion coating treatment is preferably within the range from 0.2 to 10, more preferably from 1.0 to 5.0, still more preferably from 2.2 to 2.7, g/m$^2$ of surface treated when a chromium phosphate treatment is used and is preferably within the range from 0.2 to 5, more preferably from 0.5 to 3.0, still more preferably from 1.5 to 1.9, g/m$^2$ of surface treated when a chromium oxide treatment is used. Preferably there is at least one water rinse after application of the conversion coating treatment before contact of the surface with a hydrophilicizing treatment according to this invention. Before the conversion coating treatment, or before the hydrophilicizing treatment if no conversion coating is used, the surfaces to be treated are preferably cleaned of any foreign matter and then rinsed, in one of the many ways known in the art to be effective.

The practice and benefits of the invention may be further appreciated by consideration of the following non-limiting working and comparison examples.

GENERAL CONDITIONS FOR THE EXAMPLES AND COMPARISON EXAMPLES

The surfaces treated were those on sample sheets (panels) of Type 3003 aluminum alloy. The processing sequence for all experiments included the following steps:

1. Acid cleaning by immersion of the samples sheets in a solution of 1.5% by volume of a concentrated acid cleaner formulation in water at 38° C. for 2.0 minutes.
2. Spray rinse with cold tap water for 30 sec.
3. Chromate conversion coating by immersion in either a 7.7% by weight solution in water of ALODINE ® 407-47 at 38° C. for 120 sec to produce a coating add-on mass of 2.2-2.7 g/m$^2$ or a 7.2% by weight solution in water of BONDERITE ® 713 at 43° C. for 90 sec to produce an add-on mass of 1.5-1.9 g/m$^2$.
4. Rinse with cold tap water for 30 sec.
5. Hydrophilicizing treatment at 29° C. for 60 sec by immersion of the samples.
6. Air blowoff by impinging pressurized air against sample surface until no more liquid is blown off by the air stream.
7. Oven dry at 138° C. for 20 minutes.

ALODINE ® 407-47 (keyed in the table below as "A") and BONDERITE ® 713 (keyed in the table below as "B") are both commercially available from the Parker+Amchem Div. of Henkel Corp., Madison Heights, Mich., U.S.A.; the former is an example of a concentrate for a chromium phosphate type conversion coating treatment and the latter is an example of a concentrate for a chromium oxide type conversion coating treatment. Prior art conventional hydrophilicizing treatments are exemplified by PARCOLENE ® HX-2020 and PALENE ® 210, also both available from the Parker+Amchem Div. of Henkel Corp., Madison Heights, Mich., U.S.A..

The hydrophilicizing treatment compositions used and their keys in the table below were:

---

H-1 (not according to the invention): PARCOLENE HX-2020
H-2 (not according to the invention): PALENE 210
H-3 (according to the invention):

---

0.50% by weight (dry solids) of poly(acrylic acid) with an average molecular weight of about 5000;
2.0% by weight (dry solids) of methoxypolyethylene glycol with an average molecular weight of 350;
1.57% by weight (dry solids) of potassium silicate with an alkali metal to silicon atomic ratio of 0.606:1.0;
1.08% by weight of tetrapotassium pyrophosphate;
0.38% by weight of potassium hydroxide; and the balance water. The pH was 11.06.

H-4 (according to the invention) contained the same ingredients as specified above for H-3, but had a pH of 11.34. The difference in pH from H-3 is believed to be due to slight differences in the tap water used for diluting the concentrate from which the solution was prepared.

H-5 (according to the invention) contained the same ingredients as specified above for H-3 plus 0.09% of METASOL ™ TK-100, an antimicrobial agent commercially available from Calgon Corp. and reported to contain 1-(4-thiazolyl)benzimidiazole as its principal active ingredient.

The samples prepared as described above were subjected to the following evaluation tests:

1. Salt Spray with 5% NaCl solution according to American Society for Testing Materials (hereinafter often abbreviated "ASTM") standard method B 117-61.

2. Water wettability, with and without hot aging. The water wettability was tested as follows: A syringe was placed at a distance between the test panel and the delivery point of the syringe of about 5 millimeters (hereinafter often abbreviated as "mm"). Then, an amount of 0.5 milliliter of aleionized water was dropped onto the panel over a time of 2 sec. About 25 seconds after the delivery of the water onto the panel had been completed, the diameter of the water wetted area on the sample was measured and recorded. Hot aging was performed by placing the panels in a 90° C. oven for 168 hours, then removing the panels were set at room temperature for 3 hours, before measuring the wettability.

The conversion coating and hydrophilicizing treatment compositions used and the test results obtained are shown in Table 1 below.

TABLE 1

| Example No. | Conversion Coating | Hydrophilicizing Composition | pH | Wetted Area Diameter, mm Unaged | Wetted Area Diameter, mm Aged | Salt Spray Rating, 1000 Hours |
|---|---|---|---|---|---|---|
| 1 | A | None | — | 19 | 13 | pits and pin holes |
| 2 | B | None | — | 23 | 13 | N |
| 3 | A | H-1 | 11.45 | 65 | 26 | N |
| 4 | B | H-2 | 4.57 | 20 | 17 | N |
| 5 | A | H-3 | 11.06 | 70 | 70 | N |
| 6 | A | H-4 | 11.34 | 55 | 65 | N |
| 7 | A | H-4 | 11.34 | 50 | 55 | N |
| 8 | A | H-5 | 11.3 | 45 | 45 | N |

Note for Table 1
The meaning of the Salt Spray Ratings is given in the ASTM standard already noted above.

The results in Table 1 show that the wettability of chromate coatings was decreased by hot aging when there was no hydrophilicizing treatment or even more substantially decreased when a hydrophilicizing treatment according to the now conventional method was used. Salt spray results showed that some pits and pin holes were found on the chromium phosphate coating with no hydrophilicizing treatment. The hydrophilicizing treatments according to the invention retained all or substantially all of their original hydrophilicity after heat treatment and also overcome the corrosion problem of the untreated samples in Example 1.

The invention claimed is:

1. A concentrate composition for preparing a hydrophilicizing treatment by dilution with water, said concentrate composition consisting essentially of:
   (A) from about 1.0 to about 60% by weight of a component selected from the group of water soluble polymers and copolymers of acrylic and methacrylic acids and salts thereof;
   (B) from about 1.1 to about 60% by weight of a component of water soluble polyether molecules conforming to the general formula:

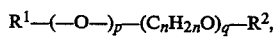

$R^1-(-O-)_p-(C_nH_{2n}O)_q-R^2$, where each of $R^1$ and $R^2$ independently is H or an alkyl moiety containing not more than 4 carbon atom; p is either 0 or 1; n is an integer from 2 to 4 inclusive, and the value of n may be selected independently for each of the q groups present in the polymer molecule; and q is an integer with a value of at least 2; and
   (C) from about 1.0 to about 40% by weight of a component of water soluble alkali metal silicates; and, optionally,
   (D) an anti-microbial effective amount of a antimicrobial agent; and, optionally,
   (E) up to about 20% by weight of a component of water soluble non-silicate alkalinizing agents; and, optionally.
   (F) water.

2. A composition according to claim 1, wherein the concentration of component (A) is in the range from about 1.0 to about 20% by weight, the concentration of component (B) is in the range from about 1.0 to about 40% by weight, the concentration of component (C) is in the range from about 1.0 to about 30% by weight, and the concentration of component (E) is in the range from about 0.4 to about 14% by weight.

3. A composition according to claim 2, wherein the concentration of component (A) is in the range from about 1.0 to about 10% by weight, the concentration of component (B) is in the range from about 1.0 to about 20% by weight:, the concentration of component (C) is in the range from about 1.0 to about 20% by weight, and the concentration of component (E) is in the range from about 0.5 to about 10% by weight.

4. A composition according to claim 3, wherein at least 85% of component (A) consists of residues from polymerizing monomers selected from the group consisting of acrylic acid, methacrylic acid, and mixtures thereof, and component (A) has an average molecular weight in the range from about 500 to about $1.25 \times 10^6$; at least 95% of component (B) consists of molecular blocks which could have been made by polymerizing ethylene oxide, and the average molecular weight of component (B) is in the range from about 76 to about $1.0 \times 10^5$; and at least 84% of component (C) consists of silicates of sodium, potassium, or a mixture thereof in which the atomic ratio between alkali metal and silicon atoms is in the range from about 0.40:1.0 to about 4.0:1.0.

5. A composition according to claim 2, wherein at least 73% of component (A) consists of residues from polymerizing monomers selected from the group consisting of acrylic acid, methacrylic acid, esters of acrylic and methacrylic acids with alcohols having no more than 4 carbon atoms, and mixtures thereof, and component (A) has an average molecular weight in the range from about 500 to about $6.0 \times 10^6$; at least 53% of component (B) consists of molecular blocks which could have been made by polymerizing ethylene oxide, propylene oxide, or a mixture thereof, and the average molecular weight of component (B) is in the range from about 76 to about $5.0 \times 10^5$; at least 52% of component (C) consists of silicates of sodium, potassium, or a mixture thereof in which the atomic ratio between alkali metal and silicon atoms is in the range from about 0.35:1.0 to about 5.0:1.0; and component (E) is selected from the group consisting of alkali metal hydroxides, phosphates, and mixtures thereof.

6. A composition according to claim 1, wherein at least 73% of component (A) consists of residues from polymerizing monomers selected from the group consisting of acrylic acid, methacrylic acid, esters of acrylic and methacrylic acids with alcohols having no more than 4 carbon atoms, and mixtures thereof, and component (A) has an average molecular weight in the range from about 500 to about $6.0 \times 10^6$; at least 53% of component (B) consists of molecular blocks which could have been made by polymerizing a mixture of molecules selected from the group consisting of ethylene oxide, propylene oxide, butylene oxide, tetrahydrofuran, and mixtures thereof, and the average molecular weight of component (B) is in the range from about 76 to about $6.0 \times 10^6$; and at least 52% of component (C) consists of silicates of sodium, potassium, or a mixture thereof in which the atomic ratio between alkali metal and silicon atoms is in the range from about 0.35:1.0 to about 5.0:1.0.

7. A process of hydrophilicizing a metal surface, said surface optionally bearing a pre-existing conversion coating, said process comprising contacting the metal surface for a time within the range from about 5 to about 600 seconds at a temperature within the range from about 10° to about 90° C. with a hydrophilicizing composition consisting essentially of water and:

(A) from about 1 to about 300 g/L, measured as dissolved solids, of a component selected from the group of water soluble polymers and copolymers of acrylic and methacrylic acids and salts thereof;

(B) from about 1 to about 300 g/L of a component of water soluble polyether molecules conforming to the general formula:

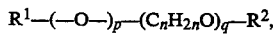

where each of $R^1$ and $R^2$ independently is H or an alkyl moiety containing not more than 4, preferably not more than 3, more preferably not more than 2, or most preferably only 1, carbon atom; p is either 0 or 1; n is an integer from 2 to 4 inclusive, preferably 2 or 3, most preferably 2, and the value of n may be selected independently for each of the q groups present in the polymer molecule; and q is an integer with a value of at least 2; and (C) from about 5 to about 200, g/L of a component of water soluble alkali metal silicates; and, optionally, (D) an anti-microbial effective amount of a anti-microbial agent; and, optionally, (E) from about 2 to about 100 g/L of a component of water soluble non-silicate alkalinizing agents.

8. A process according to claim 7, wherein, in the hydrophilicizing composition, the concentration of component (A) is in the range from about 1 to about 50 g/L, the concentration of component (B) is in the range from about 2 to about 200 g/L, the concentration of component (C) is in the range from about 5 to about 150 g/L 9. A process according to claim 8, wherein, in the hydrophilicizing composition, the concentration of component (A) is in the range from about 1 to about 50 g/L, the concentration of component (B) is in the range from about 2 to about 100 g/L, the concentration of component (C) is in the range from about 5 to about 100 g/L.

10. A process according to claim 9, wherein, in the hydrophilicizing composition, the concentration of component (A) is in the range from about 2 to about 10 g/L, the concentration of component (B) is in the range from about 10 to about 30 g/L, the concentration of component (C) is in the range from about 15 to about 60 g/L, and the pH is in the range from about 10.0 to about 13.0.

11. A process according to claim 10, wherein at least 73% of component (A) consists of residues from polymerizing monomers selected from the group consisting of acrylic acid, methacrylic acid, esters of acrylic and methacrylic acids with alcohols having no more than 4 carbon atoms, and mixtures thereof, and component (A) has an average molecular weight in the range from about 500 to about $6.0 \times 10^6$; at least 53% of component (B) consists of molecular blocks which could have been made by a mixture of molecules selected from the group consisting of ethylene oxide, propylene oxide, butylene oxide, tetrahydrofuran, and mixtures thereof; at least 52% of component (C) consists of silicates of sodium, potassium, or a mixture thereof in which the atomic ratio between alkali metal and silicon atoms is in the range from about 0.35:1.0 to about 5.0:1.0; and component (E) is selected from the group consisting of alkali metal hydroxides, phosphates, and mixtures thereof.

12. A process according to claim 11, wherein at least 85% of component (A) consists of residues from polymerizing monomers selected from the group consisting of acrylic acid, methacrylic acid, and mixtures thereof, and component (A) has an average molecular weight in the range from about 500 to about $1.25 \times 10^6$; at least 85% of component (B) consists of molecular blocks which could have been made by polymerizing ethylene oxide, propylene oxide, or a mixture thereof, and the average molecular weight of component (B) is in the range from about 76 to about $1.0 \times 10^5$; at least 84% of component (C) consists of silicates of sodium, potassium, or a mixture thereof in which the atomic ratio between alkali metal and silicon atoms is in the range from about 0.40:1.0 to about 4.0:1.0; and the pH is in the range from about 9.0 to about 14.0.

13. A process according to claim 12, wherein at least 96% of component (A) consists of residues from polymerizing monomers selected from the group consisting of acrylic acid, salts thereof, and mixtures thereof, and component (A) has an average molecular weight in the range from about 1000 to about $5.0 \times 10^5$; at least 96% of component (B) consists of molecular blocks which could have been made by polymerizing ethylene oxide, and the average molecular weight of component (B) is in the range from about 150 to about 2000; at least 96% of component (C) consists of silicates of potassium in which the atomic ratio between potassium and silicon atoms is in the range from about 0.40:1.0 to about 1.0:1.0; and component (E) is selected from the group consisting of sodium and potassium hydroxides and phosphates and mixtures thereof.

14. A process according to claim 13, wherein the surface treated is an aluminum or aluminum alloy surface precoated with a chromium oxide or chromium phosphate conversion coating; the mass added to the surface treated by the hydrophilicizing treatment is within the range from about 0.1 to 1.5 g/m² of surface treated; the temperature during contact between the hydrophilicizing composition and the metal is within the range from about 15° to about 60° C.; the time of contact is within the range from about 10 to about 300 seconds; and the wet surface coated with the hydrophilicizing composition is dried in an oven at a temperature within the range from about 50° to about 250° C.

15. A process according to claim 12, wherein the surface treated is an aluminum or aluminum alloy surface precoated with a chromium oxide or chromium phosphate conversion coating; the mass added to the surface treated by the hydrophilicizing treatment is within the range from about 0.1 to 1.5 g/m² of surface treated; the temperature during contact between the hydrophilicizing composition and the metal is within the range from about 15° to about 60° C.; the time of contact is within the range from about 10 sec to about 10 min; and the wet surface coated with the hydrophilicizing composition is dried in an oven at a temperature within the range from about 50° to about 250° C.

16. A process according to claim 11, wherein the surface treated is an aluminum or aluminum alloy surface precoated with a chromium oxide or chromium phosphate conversion coating; the mass added to the surface treated by the hydrophilicizing treatment is within the range from about 0.1 to about 2.0 g/m$^2$ of surface treated; the temperature during contact between the hydrophilicizing composition and the metal is within the range from about 12° to about 75° C.; the time of contact is within the range from about 5 sec to about 30 min; and the wet surface coated with the hydrophilicizing composition is dried in an oven at a temperature within the range from about 50° to about 250° C.

17. A process according to claim 10, wherein the surface treated is an aluminum or aluminum alloy surface precoated with a chromium oxide or chromium phosphate conversion coating; the mass added to the surface treated by the hydrophilicizing treatment is within the range from about 0.1 to about 2.0 g/m$^2$ of surface treated; the temperature during contact between the hydrophilicizing composition and the metal is within the range from about 15° to about 60° C.; the time of contact is within the range from about 5 sec to about 30 min; and the wet surface coated with the hydrophilicizing composition is dried in an oven at a temperature within the range from about 50° to about 250° C.

18. A process according to claim 9, wherein the surface treated is an aluminum or aluminum alloy surface precoated with a chromium oxide or chromium phosphate conversion coating; the mass added to the surface treated by the hydrophilicizing treatment is within the range from about 0.1 to about 2.0 g/m$^2$ of surface treated; the temperature during contact between the hydrophilicizing composition and the metal is within the range from about 12° to about 75° C.; the time of contact is within the range from about 5 sec to about 30 min; and the wet surface coated with the hydrophilicizing composition is dried in an oven at a temperature within the range from about 50° to about 250° C.

19. A process according to claim 8, wherein the surface treated is an aluminum or aluminum alloy surface precoated with a chromium oxide or chromium phosphate conversion coating; the mass added to the surface treated by the hydrophilicizing treatment is within the range from about 0.05 to about 3.0 g/m$^2$ of surface treated; the temperature during contact between the hydrophilicizing composition and the metal is within the range from about 12° to about 75° C.; the time of contact is within the range from about 5 sec to about 30 min; and the wet surface coated with the hydrophilicizing composition is dried in an oven at a temperature within the range from about 5 sec to about 30 min; and the wet surface coated with the hydrophilicizing composition is dried in an oven at a temperature within the range from about 50° to about 250° C.

20. A process according to claim 7, wherein the mass added to the surface treated by the hydrophilicizing treatment is within the range from about 0.05 to about 3.0 g/m$^2$ of surface treated; the temperature during contact between the hydrophilicizing composition and the metal is within the range from about 12° to about 75° C.; the time of contact is within the range from about 5 sec to about 30 min; and the wet surface coated with the hydrophilicizing composition is dried in an oven at a temperature within the range from about 50° to about 250° C.

* * * * *